(12) United States Patent
Nakai et al.

(10) Patent No.: US 6,447,946 B1
(45) Date of Patent: Sep. 10, 2002

(54) LITHIUM-ION BATTERY

(75) Inventors: Kenji Nakai, Uji; Takeshi Nakano, Osato-gun; Kensuke Hironaka, Fukaya; Koji Higashimoto, Nabari; Kenji Hara, Ueno; Katsunori Suzuki, Nabari; Tomohiro Iguchi, Fukaya, all of (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/519,464

(22) Filed: Mar. 6, 2000

(30) Foreign Application Priority Data

Apr. 28, 1999 (JP) ............................................. 11-121857

(51) Int. Cl.[7] .......................... H01M 2/12; H01M 4/58; H01M 6/00
(52) U.S. Cl. .................... 429/53; 429/231.1; 429/231.8; 429/218.1; 29/623.5
(58) Field of Search .............................. 429/53, 231.1, 429/231.8, 218.1; 29/623.5

(56) References Cited

U.S. PATENT DOCUMENTS

| | | | | |
|---|---|---|---|---|
| 4,205,122 A | * | 5/1980 | Miura et al. | 429/144 |
| 5,686,203 A | * | 11/1997 | Idota et al. | 429/194 |
| 5,879,836 A | * | 3/1999 | Ikeda et al. | 429/231.8 |
| 6,019,802 A | * | 2/2000 | Ishizuka et al. | 29/623.5 |
| 6,048,637 A | * | 4/2000 | Tsukahara et al. | 429/53 |
| 6,190,803 B1 | * | 2/2001 | Tomiyama et al. | 429/245 |
| 6,194,099 B1 | * | 2/2001 | Gernov et al. | 429/213 |

FOREIGN PATENT DOCUMENTS

| | | |
|---|---|---|
| EP | 02056871 | 2/1990 |
| EP | 0 746 047 A1 | 12/1996 |
| EP | 0 762 521 A2 | 3/1997 |
| EP | 11204107 | 1/1998 |
| EP | 0 973 221 A1 | 1/2000 |
| JP | 2701347 | 10/1997 |
| JP | 10-182157 | 7/1998 |
| JP | 10-182160 | 7/1998 |
| JP | 2917317 | 4/1999 |
| JP | 11-111280 | * 4/1999 ................... 429/53 |
| JP | 11-185805 | * 7/1999 ................... 429/53 |

* cited by examiner

Primary Examiner—Tom Dunn
Assistant Examiner—L. Edmondson
(74) Attorney, Agent, or Firm—Oliff & Berridge, PLC (57) ABSTRACT

A cylindrical lithium-ion battery with high safety, high capacity and high power has a winding group having a positive electrode, a negative electrode and at least one separator, and a connecting portion for connecting to respective terminals from the winding group accommodated in a battery container, and which is provided with an inner pressure-reducing mechanism for discharging gas according to an increase in inner pressure inside the battery container. The positive electrode includes a collector whose both surfaces are applied with composing material including lithium-manganese complex oxide, the thickness of the composing material on the both surfaces of the collector is at least 210 $\mu$m and the amount of the active material per one surface of the collector is at least 240 g/m$^2$. The compounding ratio of the lithium-manganese complex oxide in the composing material is preferably at least 80 wt %.

18 Claims, 2 Drawing Sheets

LITHIUM-ION BATTERY

BACKGROUND OF THE INVENTION

1. Field of the Invention

The present invention relates to a lithium-ion battery, and in particular relates to safety and life characteristics of a lithium-ion battery where a winding group having a positive electrode, a negative electrode and at least one separator, and a connecting portion for connecting to respective terminals from the winding group are accommodated in a battery container, and which is provided with an inner pressure-reducing mechanism for discharging gas according to an increase in inner pressure inside the battery container.

2. Description of the Related Art

Because a lithium-ion secondary battery or cell has high energy density as its merit, it is being used as a power supply source for portable equipment mainly as a VTR camera, a note type computer, a portable telephone and the like. In an interior of a cylindrical lithium-ion second battery, a winding type structure is formed where a positive electrode member and a negative electrode member, each comprising a strip-shaped metal foil applied with active material, are wound spirally in section such that they are prevented from contacting each other by a separator interposed therebetween, thereby forming a winding group or a winding body. The winding group is accommodated in a cylindrical battery can serving as a battery container, and then the can is sealed after pouring electrolytic solution into the can.

An ordinary cylindrical lithium-ion battery has an external dimension of a diameter of 18 mm and a height of 65 mm, which is called 18650 type, and it is widely spread as a small-sized lithium-ion battery for a civilian use. Lithium cobaltate, having high capacity. and long life characteristics, is mainly used as positive electrode active material for the 18650 type lithium-ion battery, and battery capacity thereof is approximately 1.3 Ah to 1.7 Ah and battery power (output) thereof is about 10 W or so.

Meanwhile, in order to cope with the environmental problems in the automotive industry, development of electric vehicles (EVs) whose power sources are confined completely to batteries so that there is no gas exhausting and development of hybrid electric vehicles (HEVs) where both internal combustion engines and batteries are used as their power sources have been facilitated and some of them have reached a practical stage. Secondary batteries for the EVs and HEVs are required to have high power and high-energy characteristics. Attention to the lithium-ion batteries is being paid as secondary batteries that can meet this requirement. In order to obtain high capacity and high power secondary batteries, improvements in dimensions for electrodes have been devised to date. For example, Japanese Patent No. 2701347 discloses the optimal values of thickness of composing material layers for the positive electrode and negative electrode members.

However, in the case of the lithium-ion batteries, as the power becomes higher, the safety tends to be regarded as important. Specifically, in such high capacity and high power batteries used as power sources for the EVs and HEVs, the safety is not secured necessarily in the range disclosed in the Japanese Patent No. 2701347. Further, since the high capacity and power batteries are required to allow large current charging and large current discharging, it is difficult to provide such batteries with a current cut-off mechanism (a shutdown switch of a kind) that actuates in response to an increase in inner pressure inside the batteries at an abnormal time, which is generally employed in the 18650 type lithium-ion batteries.

In a case in which the EV or HEV carries persons or occupants, it is at least one necessary and extremely important characteristic to secure safety of a battery itself at a time of overcharging which may occur when a charging control system has been broken down, at a time of battery crush, at a time of foreign matter thrusting, at a time of external short-circuiting or the like which may be encountered at an accidental collision of the vehicle equipped with the battery. The term "safety of a battery" used herein means that the behavior of a battery fallen into such abnormal states is not only prevented from insuring vehicle occupants including a driver physically but also it is suppressed from damaging the vehicle body as least as possible.

In general, carbon material used as negative electrode active material for the lithium-ion battery is in a state in which lithium ions are completely discharged, namely, the carbon material is in a discharged state. Accordingly, active material of a discharged state, for example, lithium cobaltate ($LiCoO_2$), lithium nickelate ($LiNiO_2$), lithium manganate ($LiMn_2O_4$) or the like is also used for a positive electrode. However, since these active materials for the positive electrode have not sufficient electroconductivity, they are mixed, together with binder, for use with electroconductive powder serving as electroconductive material such as graphite powder, carbon black powder or the like which is stable and inexpensive.

The lithium manganate having the spinel structure as a crystal structure has a feature that its thermal stability is superior to that of the lithium cobaltate or lithium nickelate. For this reason, a battery where the lithium manganate is used for positive electrode active material is suitable as a high safety battery for a large-sized lithium-ion battery for power storage, the EV or HEV, or the like. However, the crystal of the lithium manganate expands/shrinks according to insertion/department of lithium ions (or occlusion/release thereof) due to charging/discharging. Then, when the charging/discharging accompanied with expansion/shrinking is repeated, the electroconductivity required for the positive electrode deteriorates and the discharging capacity decreases. Further, in the positive electrode where the lithium manganate is used as the active material, its manganese component dissolves into non-aqueous electrolytic solution, irrespective of a charging/discharging state. The dissolution of the manganese component causes dropping in a charging/discharging cycle life and/or declining in preserving characteristics.

For improving the charging/discharging cycle characteristic in the lithium-ion battery, Japanese Patent Application Laid-Open (JP-A) No. 10-182160 discloses a technique for manufacturing lithium manganate with a high crystalline property by improving the structural conditions of the lithium manganate, or by doping additive or the like. JP-A No. 10-182157 also discloses a technique for doping elements of different kinds in the crystalline structure of the lithium manganate. However, a sufficient cycle life has not attained to date.

SUMMARY OF THE INVENTION

In view of the above circumstances, an object of the present invention is to provide a lithium-ion battery which retains high safety while having high capacity and high power.

Also, another object of the invention is to improve a cycle life of the lithium-ion battery using lithium-manganese complex oxide for a positive electrode.

In order to achieve the above first object, a first aspect of the present invention is a lithium-ion battery where a winding group, having a positive electrode, a negative electrode and at least one separator, and a connecting portion for connecting to respective terminals from the winding group are accommodated in a battery container, and which is provided with an inner pressure-reducing mechanism for discharging gas according to an increase in inner pressure inside the battery container, wherein the positive electrode comprises a collector whose both surfaces are applied with composing material including lithium-manganese complex oxide, the thickness of the composing material on the both surfaces of the collector is at least 210 μm, and the amount of the active material per one surface of the collector is at least 240 g/m$^2$.

According to the aspect, in order to secure a lithium-ion battery with high capacity and high power, the positive electrode comprises the collector whose both surfaces are applied with composing material including lithium-manganese complex oxides. In the lithium-ion battery, when the abnormal state described above occurs, gas is generated due to reaction between electrolytic solution and the composing material including the lithium-manganese complex oxide while maintaining a large current charging state or a large current discharging state, and thereby inner pressure inside the battery container increases in some cases. In order to prevent the increase in the inner pressure, the lithium-ion battery generally has an inner pressure-reducing mechanism such as a safety valve, a rupturable valve or the like for discharging gas out of the container at predetermined inner pressure. In the lithium battery provided with such a mechanism, in a case in which the thickness of the composing material on the both surfaces of the collector is set to at least 210 μm and the amount of the active material per one surface of the collector is set to at least 240 g/m$^2$, the gas is much gently discharged without any violent discharging from the mechanism. Accordingly, a battery superior in safety can be obtained.

In this aspect, in a case in which a compounding ratio of the lithium-manganese complex oxide is set to at least 80 weight %, a lithium-ion battery with high capacity and high safety can be realized since the discharging capacity can be prevented from lowering. Also, it is preferable that the negative electrode comprises a second collector whose both surfaces are applied with second composing material including carbon material, and the thickness of the second composing material on the both surfaces of the second collector is set to at least 130 μm.

The present inventors have studied eagerly a case in which the lithium manganate is used for the positive electrode, and as a result of it, realized that, when the lithium manganate is used for the positive electrode, the deterioration of the negative electrode is larger than that in a case of using lithium cobaltate for the positive electrode. The inventors have also found the causes: Since the volume of the lithium manganate reduces at a time of charging, the pressurizing force of the winding group drops. As this result, collapse in an electroconductive network in the composing material of the negative electrode is brought about. Therefore, in order to achieve the another object, according to a second aspect of the present invention, a lithium-ion battery where a winding group having a positive electrode, a negative electrode and at least one separator, and a connecting portion for connecting to respective terminals from the winding group are accommodated in a battery container, and which is provided with an inner pressure-reducing mechanism for discharging gas according to an increase in inner pressure inside the battery container, wherein the second composing material contains fiber-shaped or needle-shaped conductive material.

According to the second aspect, since the conductive material retains the electroconductive network in the composing material of the negative electrode, the cycle characteristic can be improved. In this aspect, it is preferable that the conductive material is carbon fibers manufactured by a vapor-phase method or conductive ceramic fibers, and it is more preferable that an average length of the fibers is at least 5 μm and an average diameter of the fibers is at most 5 μm.

The present invention will become more obvious by referring to the following preferable embodiments.

DETAILED DESCRIPTION OF THE PREFERRED EMBODIMENTS (First Embodiment)

A first embodiment of the cylindrical lithium-ion battery to which the present invention is applied will be explained hereinafter with reference to FIG. 1.

<Positive Electrode Member>

Lithium manganate ($LiMn_2O_4$) powder which is active material, scale-shaped graphite (an average particle size: 20 μm) which is electroconductive material, and polyvinylidene fluoride (PVDF) which is binder are mixed at a predetermined compounding ratio described later, the obtained mixture is added with N-methyl-2-pyrrolidone (NMP) which is dispersing solvent, and thus added mixture is mixed, thereby producing slurry. The slurry is applied substantially uniformly and homogeneously to both surfaces of an aluminum foil (positive electrode collector) having the thickness of 20 μm and serving as a collector. At this time, an uncoated or unapplied portion having a width of 50 mm is left at one side edge along a longitudinal direction (upper or lower direction in FIG. 1) of the positive electrode member. Thereafter, the positive electrode member is dried, pressed and cut, a positive electrode member is obtained having the width of 300 mm, a predetermined length and a predetermined thickness of the applied portion of composing material for the positive electrode as described later. The apparent density of the layer of the positive electrode composing material is 2.65 g/cm$^3$. The above-unapplied portion is notched and a remaining portion thereof forms lead pieces. Also, an interval or space between adjacent lead pieces is set to 20 mm and the width of the lead pieces is set to 10 mm.

<Negative Electrode Member>

92 weight parts of "Carbotron P" (trade name) powder, manufactured by Kureha Chemical Industry Co., Ltd., which is amorphous (noncrystalline) carbon is added with 8 weight parts of PVDF as binder, is added with NMP which is dispersing solvent, is mixed to produce slurry. The slurry thus obtained is applied substantially uniformly and homogeneously to both surfaces of a rolled copper foil (negative electrode collector) having the thickness of 10 μm and serving as a second collector. At this time, an unapplied portion with the thickness of 50 mm is left at one side edge in a longitudinal direction (lower or upper direction in FIG. 1) of the negative electrode member. Thereafter, the rolled copper foil thus coated is dried, pressed and cut, thereby obtaining a negative electrode number having the width of 305 mm, a predetermined length and a predetermined thickness of the applied portion of the composing material for the negative electrode as described later. The apparent density of the layer of the negative electrode composing material having the predetermined thickness is 1.0 g/cm³. The above-unapplied portion is notched in the same manner as the positive electrode member, and a remaining portion thereof forms lead pieces. Also, the interval or space between adjacent lead pieces is set to 20 mm and the width of the lead pieces is set to 10 mm.

<Assembly of Battery>

The positive electrode member and the negative electrode member thus manufactured are wound with a separator (s) made of polyethylene and a thickness of 40 μm interposed therebetween, such that they do not contact each other directly. At this time, the lead pieces of the positive electrode member and the lead pieces of the negative electrode member are positioned at both end faces opposed to each other with respect to a winding group 6 (See FIG. 1). Also, the lengths of the positive electrode member, the negative electrode member and the separators are adjusted and thus the diameter of the winding group is set to 65±0.1 mm.

Figure 1:
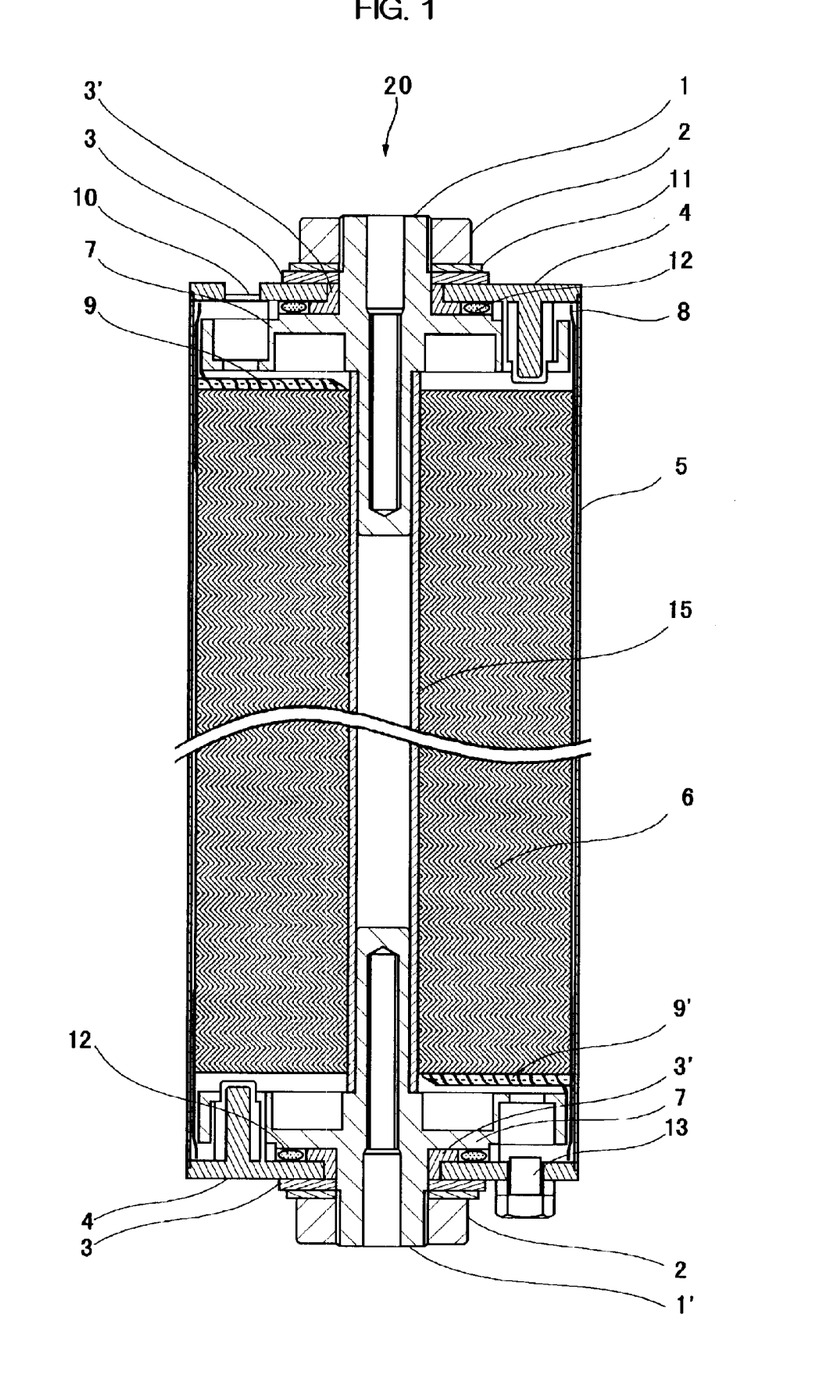
FIG. 1 is a sectional view of a cylindrical lithium-ion battery of a first embodiment to which the present invention is applicable.

As shown in FIG. 1, lead pieces 9 extending from the positive electrode member are deformed and all the lead pieces 9 are gathered around a peripheral face of a flange portion 7 spreading from a periphery of a pole strut (a positive electrode external terminal 1 ) which positions almost on an extending line from a hollow and cylindrical core 15 of the winding group 6. After contacting the lead pieces 9 with the peripheral face of the flange portion 7, they are connected and fixed to each other by ultrasonic welding.

Connecting operation between a negative electrode external terminal 1' and lead pieces 9' extending from the negative electrode member is carried out in the same manner as the connecting operation between the positive electrode external terminal 1 and the lead pieces 9 extending from the positive electrode member.

Then, an insulating covering 8 is applied on to the entire peripheral face of the flange portions 7 of the positive electrode external terminal 1 and the negative electrode external terminal 1'. The insulating covering 8 is also applied on to the entire peripheral face of the winding group 6. An adhesive tape comprises a base member formed of polyimide and adhesive agent applied to one surface thereof is used as the insulating covering 8. This adhesive tape is wound several times from the peripheral face of the flange portion 7 to the outer peripheral surface of the winding group 6, thereby forming the insulating covering 8. The number of windings of the insulating covering 8 is adjusted such that the insulating covering 8 may exist within the maximum diameter portion of the winding group 6, and the maximum diameter portion is made slightly smaller than the inner diameter of a battery container 5 so that the winding group 6 is inserted into the battery container 5. Incidentally, the outer and inner diameters of the battery container 5 are respectively 67 mm and 66 mm.

Next, as shown in FIG. 1, second ceramic washers 3' are respectively fitted on the pole strut whose distal end configures the positive electrode external terminal 1 and the pole strut whose distal end configures the negative electrode external terminal 1'. Each second washer 3' is made of alumina and has a portion abutting a back face of a disc-shaped battery lid plate 4, whose thickness of the abutting portion, inner diameter and outer diameter are respectively 2 mm, 16 mm and 25 mm. Also, alumina-made first planer ceramic washers 3 having the thickness of 2 mm, the inner diameter of 16 m and the outer diameter of 28 mm are respectively disposed on the battery lid plates 4, and the positive electrode external terminal 1 and the negative electrode external terminal 1' are respectively inserted in the ceramic washers 3. Then, the peripheral end faces of the battery lid plates 4 are fitted in openings of the battery container 5, and the entire contacting portions of them are laser-welded. At this time, the positive electrode external terminal 1 and the negative electrode external terminal 1' project outside from the respective battery lid plates 4 through holes formed at centers of the battery lid plates 4. As shown in FIG. 1, the first ceramic washers 3 and metal washers 11 which is smoother than those of the bottoms of metal nuts 2 are respectively fitted in the positive electrode external terminal 1 and the negative electrode external terminal 1' in this order. A cleavage valve 10 that cleaves in response to an increase in battery inner pressure is equipped with one side of battery lid plates 4. The cleavage valve 10 is set to cleaving pressure of 1.27 to 1.77×10⁶ Pa (13 to 18 kg/cm²).

Next, the nut 2 is screwed to each of the positive electrode external terminal 1 and the negative electrode external terminal 1' to fasten and fix the battery lid plate 4 with the flange portion 7 through the second ceramic washer 3', the first ceramic washer 3 and the metal washer 11. At this time, the value of the fastening torque was 6.86 N·m(70 kgf·cm). Incidentally, the metal washer 11 was not rotated until the fastening work was completed. In this state, a generating element accommodated in the battery container 5 is shut off from the atmosphere by each O-ring 12 made of rubber (EPDM) interposed between the back face of the battery lid plate 4 and the flange portion 7.

Thereafter, electrolytic solution is poured in a predetermined amount into the battery container 5 through a liquid-pouring opening 13 provided at another side of battery lid plates 4, and then the liquid-pouring opening 13 is sealed so that assembly of a cylindrical lithium-ion battery 20 is completed.

The electrolytic solution is prepared previously in the following manner: 6-lithium phosphate fluoride (LiPF₆) is dissolved at 1 mole/liter into a mixed solution where the volume ratio of ethylene carbonate, dimethyl carbonate and diethyl. carbonate is 1:1:1. Incidentally, a current cutting-off mechanism, which cuts off current in response to an increase in inner pressure inside the battery container 5, is not equipped with the cylindrical lithium-ion battery 20.

EXAMPLES

Next, examples of the cylindrical lithium-ion battery 20 manufactured in accordance with the first embodiment will be explained in detail.

Example 1

As shown in the following Table 1, in this example, the battery was manufactured in the following manner. The compounding ratio of the lithium manganate (LiMn₂O₄) powder, the scale-shaped graphite, and the PVDF was 87:8.7:4.3 in weight percent (wt %), the thickness of the layer of the composing material for the positive electrode active material (hereinafter called "positive electrode composing material layer") on the both sides (where the thickness of the positive electrode collector is not included) was 210 μm and the length thereof was 690 cm, the amount of the active material for the positive material (hereinafter called "positive electrode active material mass") per one side of the positive electrode collector was 241 g/m², and the thickness of the layer of the composing material for the negative electrode active material (hereinafter called "negative electrode composing material layer") on the both sides (where the thickness of the negative electrode collector is not included) were 130 μm and the length thereof was 708 cm.

chargeable capacity up to a final voltage of 0 V (Li/Li+ reference) of the negative electrode. Incidentally, in the positive electrode active material, the chargeable capacity of the active material per unit weight of the lithium manganate was 105 mAh/g, and the chargeable capacity of the active material per unit weight of the lithium cobaltate was 155 mAh/g. The chargeable capacity of the negative electrode active material was 450 mAh/g.

The negative electrode member was set to be longer than the positive electrode member by 18 cm such that in a winding direction the positive electrode member neither extends beyond the negative electrode member at the innermost periphery nor even at the outermost periphery of the

TABLE 1

| | | Positive Electrode Composing Material Layer | | | | Negative Electrode Composing Material Layer | |
|---|---|---|---|---|---|---|---|
| | Active Material | Compounding Ratio | Thickness (μm) | Length (cm) | Active Material Mass (g/m²) | Thickness (μm) | Length (cm) |
| Example 1 | LiMn$_2$O$_4$ | 87:8.7:4.3 | 210 | 690 | 241 | 130 | 708 |
| Example 2 | LiMn$_2$O$_4$ | 80:15.7:4.3 | 240 | 640 | 254 | 137 | 658 |
| Example 3 | LiMn$_2$O$_4$ | 87:8.7:4.3 | 270 | 565 | 311 | 168 | 583 |
| Example 4 | LiMn$_2$O$_4$ | 91:4.7:4.3 | 220 | 656 | 265 | 143 | 674 |
| Example 5 | LiMn$_2$O$_4$ | 75:20.7:4.3 | 250 | 628 | 248 | 134 | 646 |
| Control 1 | LiMn$_2$O$_4$ | 87:8.7:4.3 | 200 | 714 | 231 | 124 | 732 |
| Control 2 | LiMn$_2$O$_4$ | 91:4.7:4.3 | 200 | 704 | 241 | 130 | 722 |
| Control 3 | LiMn$_2$O$_4$ | 80:15.7:4.3 | 220 | 682 | 233 | 125 | 700 |
| Control 4 | LiCoO$_2$ | 87:8.7:4.3 | 220 | 578 | 254 | 204 | 596 |
| Control 5 | LiCoO$_2$ | 57:33:10 | 220 | 668 | 166 | 133 | 686 |

Examples 2 to 5

Also, as shown in Table 1, batteries of Examples 2 to 5 were manufactured according to the same battery manufacturing method as that of the battery of the Example 1 by changing the compounding ratio of the lithium manganate powder, the scale-shaped graphite, and the PVDF, the thickness and the length of the positive electrode composing material layer, the positive electrode active material mass per one side of the positive electrode collector, and the thickness and the length of the negative electrode composing material layer. Incidentally, in the batteries of these Examples, the Table 1 can be seen in the same manner as the case of the Example 1.

<Control 1 to 5>

Further, batteries of Controls (Comparative Examples) 1 to 5 were manufactured so as to see the effects of the above Examples. In the batteries of the Controls, the Table 1 can be seen in the same manner as the case of the Example 1. Incidentally, lithium cobaltate (LiCoO$_2$) called "Cellseed C-10" (trade name) manufactured by Nippon Chemical Industry Co., Ltd. was used for Controls 4 and 5 instead of the lithium manganate used in the battery of Example 1.

It should be noted that the charge (preparing amounts) of the positive electrode active material and the negative electrode active material for respective batteries of the Examples and Controls were determined as follows:

Regarding unit area of the positive electrode and the negative electrode opposed to each other via the separators, chargeable capacity up to a final voltage of 4.5 V (Li/Li+ reference) of the positive electrode was set to the same as winding group when winding thereof. In a direction vertical to the winding direction, the width of the negative electrode composing material was set to be longer than that of the positive electrode composing material by 5 mm so as the applied portion of the positive electrode composing material not to extend beyond that of the negative electrode composing material.

<Test and Evaluation>

Next, respective batteries of the Examples and Controls thus manufactured were tested in the following Tests 1 and 2.

[Test 1] After each battery was charged at the room temperature, it was discharged so that the discharging capacity was measured. The charging conditions were set on a constant voltage of 4.2 V, and a limiting current of 80 A, and a charging time of 3.5 hours. The discharging conditions were set on a constant current of 20 A and a final voltage of 2.5 V.

[Test 2] Each battery was continuously charged with a constant current of 80 A at the room temperature, and the behavior of each battery was observed. In the phenomenon, after the cleavage valve cleaves, gas discharge occurs. In order to show the magnitude or extent of this gas discharge, the weight of the battery after the phenomenon occurred was measured and percentage of the weight of the battery after the phenomenon to that before the phenomenon was calculated. Also, the observation was made as to whether the battery container 5 was deformed or not after gas had been discharged.

<Test Results>

The test results of the Test 1 and the Test 2 are shown in the following Table 2.

TABLE 2

|  | Test 1 | Test 2 | | |
| --- | --- | --- | --- | --- |
|  | Discharging Capacity (Ah) | Battery Behavior at Continuous Charging | Container Deformation | Battery Weight (%) |
| Example 1 | 82.40 | Gentle gas discharge from valve | Non | 81 |
| Example 2 | 80.34 | Gentle gas discharge from valve | Non | 82 |
| Example 3 | 86.93 | Gentle gas discharge from valve | Non | 85 |
| Example 4 | 86.11 | Gentle gas discharge from valve | Non | 83 |
| Example 5 | 77.04 | Gentle gas discharge from valve | Non | 84 |
| Control 1 | 81.41 | Gentle gas discharge from valve | Non | 71 |
| Control 2 | 84.05 | Violent gas discharge from valve | Non | 71 |
| Control 3 | 78.53 | Violent gas discharge from valve | Non | 72 |
| Control 4 | 109.00 | Violent gas discharge from valve | Distended | 61 |
| Control 5 | 82.46 | Violent gas discharge from valve | Distended | 63 |

In each battery of the Controls 1 to 3, after the cleavage valve cleaved, gas together with a portion of battery contents was discharged relatively violently from the cleavage and the weight of the batteries after the phenomenon ranged from 71% to 72%. No deformation of the batteries could be observed. In each battery of the Controls 4 and 5, after the valve cleaved, gas together with the portion of the battery contents was discharged violently and urgently and the weight of the batteries after the phenomenon ranged from 61% to 63% which was the lightest among the batteries. Further, since distention or expansion of the battery container 5 was observed to these two batteries, it was understood that the magnitude of gas discharge was large.

On the contrary, in the battery of each Example, after the valve cleaved, gas was discharged gently or mildly and no deformation was observed to the battery container. 80% or more of the original weight retained in these batteries. Thus, the contents of the batteries were hardly discharged and the behavior of the batteries was very gentle.

As is clearly understood from Tables 1 and 2, in the batteries where the lithium manganate serving as the lithium-manganese complex oxide is used for the positive electrode active material, in the case in which the thickness of the positive electrode composing material layer on the both surfaces of the positive electrode collector was at least 210 μm, and the positive electrode active material mass per one side of the positive electrode collector was at least 240 g/m², the lithium-ion batteries' behavior was very gentle even when they fall into the abnormal state, and accordingly, the batteries enabled to realize excellent safety.

Further, when the compounding ratio of the positive electrode active material in the positive electrode composing material was less than 80 wt %, the batteries' behavior was gentle at the time of continuous charging, but the discharging capacity was remarkably reduced. Therefore, it is preferable that the compounding ratio of the positive electrode active material in the positive electrode composing material is at least 80 wt %. Furthermore, in this case, as shown in the batteries of the Examples 1 to 5, it is preferable that the thickness of the negative electrode composing material layer employing the carbon material as the negative electrode active material is at least 130 μm.

On the other hand, even when the thickness of the positive electrode composing material layer was at least 210 μm and the positive electrode active material mass per one surface of the positive electrode collector is at least 240 g/m², the battery, as shown in the Control 4, whose positive electrode active material was used other than the lithium manganate, a sufficient safety could not be secured. As the large capacity was obtained especially in the battery of the Control 4, in the battery of the Control 5, the compounding ratio of the positive electrode active material was reduced so that the capacity was set to the level of the each battery of the Examples. However, the large magnitude of the gas discharge was retained the same.

As stated above, the cylindrical lithium-ion battery 20 of the present embodiment behaved very gently even when it was put in the abnormal state and it could be recognized as an excellent battery with high safety. Thus, the battery with such high capacity, high power and extremely high safety is suitable especially for the power supply source of the EV or HEV.

(Second Embodiment)

Figure 2:
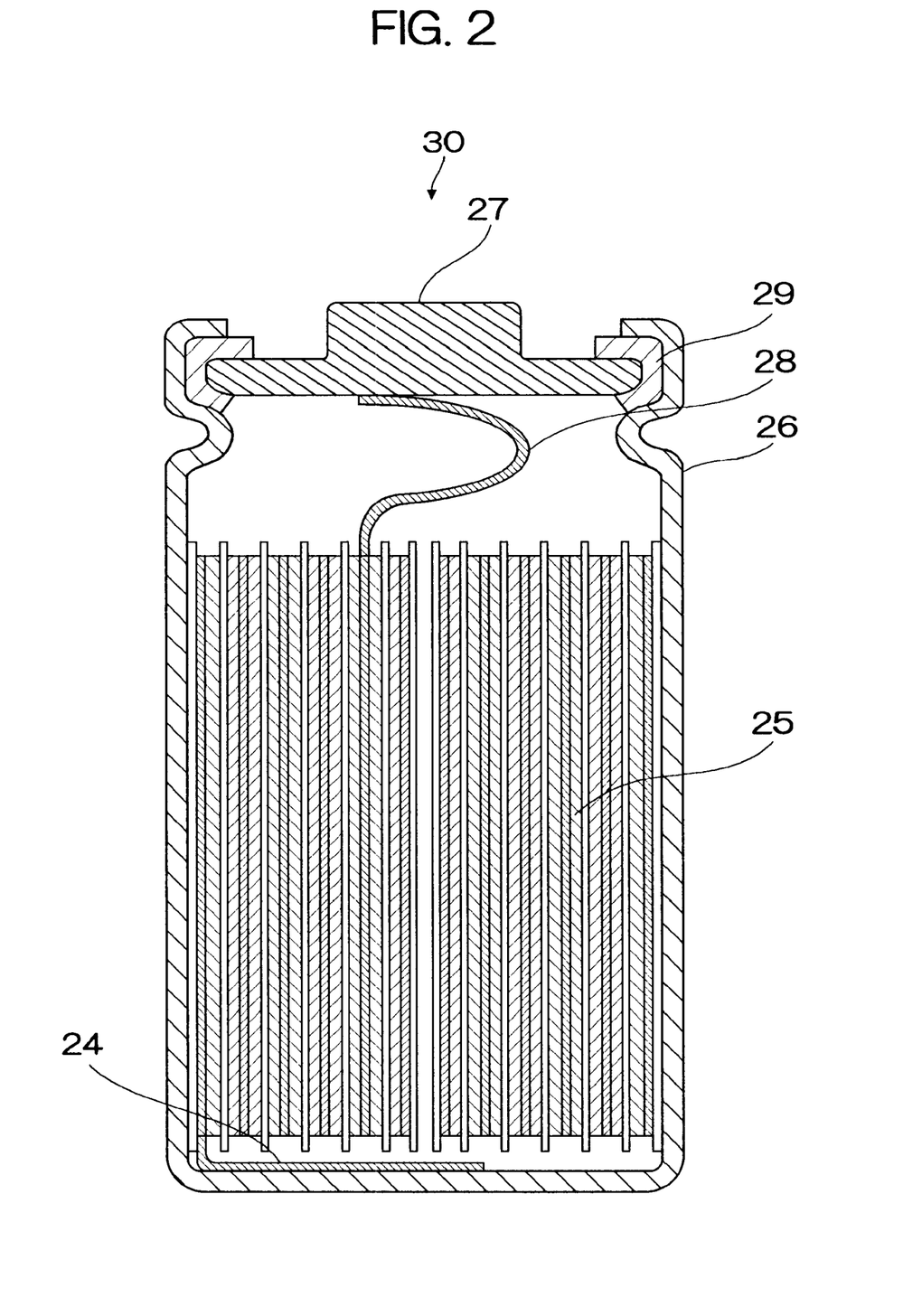
FIG. 2 is a sectional view of a cylindrical lithium-ion battery of a second embodiment to which the present invention is applicable.

Next, a second embodiment of the cylindrical lithium-ion battery to which the present invention is applied will be described hereinafter. In this embodiment, the same parts or members as those in the first embodiment are denoted by the same reference numerals and explanation thereof is omitted, and only different parts or members will be explained below.

<Positive Electrode Member>

In this embodiment, the lithium manganate powder, the scale-shaped graphite and the PVDF are mixed at ratio of 80:15:5 by weight, and the mixture thus obtained is added and mixed with NMP, thereby producing slurry. The aluminum foil used is one with 50 mm×450 mm size in plan, and the apparent density of the positive electrode composing material layer is 2.8 g/cm³.

<Negative Electrode Member>

The "Carbotron P" which is the amorphous carbon, electroconductive material comprising carbon fiber powder or conductive ceramic fiber powder as described later, the PVDF are mixed at a ratio of 85:5:10 by weight, and the mixture thus obtained is added and mixed with NMP, thereby producing slurry. The rolled copper foil used is one with 52 mm×490 mm size in plan, and the apparent density of the negative electrode composing material layer is 1.0 g/cm³.

<Assembly of Battery>

The positive electrode member and the negative electrode member are wound with a polyethylene separator(s) having the thickness of 25 μm interposed therebetween to manufacture a winding group 25. The winding group 25 is inserted into the battery container 26, and a conductive negative electrode tab terminal 24 welded in advance to the rolled copper foil (a negative electrode collector) serving as a second collector is welded to a bottom face of a battery container 26 having a bottom. On the other hand, a conductive positive electrode tab terminal 28 welded in advance to the aluminum foil (a positive electrode collector) is welded to a bottom face of a positive electrode cap 27 having a hat-shaped section. In this positive electrode cap 27, a current cutoff mechanism (a pressure switch) operated in accordance with an increase in inner pressure inside the battery such as a PTC (Positive Temperature Coefficient) element or the like, and an inner pressure reducing mechanism such as a safety valve operated at higher pressure than the current cutoff mechanism, are assembled or incorporated. In this embodiment, the current cutoff mechanism (a pressure switch) with operation pressure of $8.83 \times 10^5$ Pa (9 kgf/cm$^2$) and the safety valve with operation pressure of $1.96 \times 10^6$ Pa (20 kgf/cm$^2$) were used.

Then, 5 ml of electrolytic solution is poured in the battery container 26. The electrolytic solution used is prepared in the following manner. LiPF$_6$ was dissolved at 1 mole/liter into a solution where ethylene carbonate and dimethyl carbonate are mixed at a ratio of 1:2 by volume. The positive electrode cap 27 is disposed on an upper portion of the battery container 26, and the upper portion of the battery container 26 is caulked through an insulating gasket 29 to be sealed so that assembly of a cylindrical lithium-ion battery 30 of 18650 type having a diameter of 18 mm and a height of 65 mm is completed.

Next, Examples of the cylindrical lithium-ion battery 30 manufactured according to the present embodiment will be explained in detail. Incidentally, a battery of a Control (Comparative Example) manufactured for comparison will also be explained.

EXAMPLES

Example 6

As shown in the following Table 3, in this Example, a battery was completed by employing carbon fibers manufactured by a vapor phase method as the conductive material for the negative electrode. In this example, an average fiber diameter of the carbon fibers was 0.2 μm and an average fiber length thereof was 15 μm.

TABLE 3

| | Conductive Material | Ave. Fiber Dia. (μm) | Ave. Fiber Length (μm) |
|---|---|---|---|
| Example 6 | Vapor-phase Carbon Fibers | 0.2 | 15 |
| Example 7 | Acetylene Black | Ave. Primary Particle Dia.:40 nm | |
| Example 8 | Potassium Titanate Wiskers Coated with Carbon | 0.5 | 15 |
| Example 9 | Potassium Titanate Wiskers Coated with Silver | 0.6 | 15 |
| Example 10 | Vapor-phase Carbon Fibers | 5 | 15 |
| Example 11 | Vapor-phase Carbon Fibers | 10 | 15 |
| Example 12 | Vapor-phase Carbon Fibers | 0.2 | 5 |
| Example 13 | Vapor-phase Carbon Fibers | 5 | 5 |
| Example 14 | Vapor-phase Carbon Fibers | 0.2 | 1 |
| Control 6 | — | — | — |

Example 7

As shown in Table 3, in this Example, a battery was completed by employing acetylene black as the conductive material for the negative electrode. An average value of primary particle sizes in the acetylene black used was 40 nm.

Example 8

As shown in Table 3, in this Example, a battery was completed by employing potassium titanate whiskers coated with carbon as the conductive material for the negative electrode. An average fiber diameter of the carbon-coated potassium titanate whiskers was 0.5 μm and an average fiber length thereof was 15 μm.

Example 9

As shown in Table 3, in this Example, a battery was completed by employing potassium titanate whiskers coated with silver as the conductive material for the negative electrode. An average fiber diameter of the silver-coated potassium titanate whiskers was 0.6 μm and an average fiber length thereof was 15 μm.

Examples 10 to 14

As shown in Table 3, in the Example 10 to Example 14, batteries were completed by employing carbon fibers manufactured by a vapor-phase method as the conductive material for the negative electrode, in the same manner as the Example 6. In these Examples, manufacturing conditions for carbon fibers were adjusted so that average fiber diameters and average fiber lengths of the carbon fibers were alternated variously in the following manner. In the Example 10, the average fiber diameter was 5 μm and the average fiber length was 15 μm; in the Example 11, the average fiber diameter was 10 μm and the average fiber length was 15 μm; in the Example 12, the average fiber diameter was 0.2 μm and the average fiber length was 5 μm; in the Example 13, the average fiber diameter was 5 μm and the average fiber length was 5 μm; and in the Example 14, the average fiber diameter was 0.2 μm and the average fiber length was 1 μm.

<Control 6>

As shown in Table 3, a battery of this Control was completed by employing a negative electrode composing material in which no conductive material was included. Namely, the negative electrode composing material of this battery was prepared by mixing the amorphous carbon of 90 wt % and the PVDF of 10 wt % at a compounding ratio, and the mixture thus obtained was added and mixed with NMP, thereby producing the slurry.

<Test and Evaluation>

[Test]

Next, regarding the respective batteries of the Examples and Control thus manufactured, charging/discharging cycle test was performed. In the charging/discharging cycle test, initial discharging capacity of each battery was measured after initial stabilizing operation, and discharging capacity of the 200th cycle was measured after the charging/discharging cycle was repeated under conditions as shown in the following Table 4. Then, percentage of the discharging capacity of the 200th cycle to the initial discharging capacity (hereinafter, called "capacity retaining percentage of 200th cycle) was calculated.

TABLE 4

| | |
|---|---|
| Charging | Constant Voltage Charging: 4.2 V, Limiting Current: 1400 mA, 3H, and 50° C. atmosphere |
| Discharging | Constant Current Discharging: 1400 mA, 24 min., and 50° C. atmosphere |
| Halt time | 10 min. between Charging and Discharging |
| Confirmation of Discharging Capacity | For every 25 cycles, 50° C. atmosphere |
| | Charging  3H, Current: 1400 mA, Constant Voltage: 4.2 V |
| | Discharging  Current: 1400 mA, Final Voltage of Discharging: 2.7 V |

[Test Results]

The test results of the charging/discharging cycle test are shown in the following Table 5.

TABLE 5

| | Capacity Retaining Percentage of 200th Cycle (%) |
|---|---|
| Example 6 | 83 |
| Example 7 | 64 |
| Example 8 | 72 |
| Example 9 | 75 |
| Example 10 | 78 |
| Example 11 | 63 |
| Example 12 | 80 |
| Example 13 | 76 |
| Example 14 | 70 |
| Control 6 | 30 |

[Evaluation]

As shown in Table 5, the batteries of the Examples 6 to 14 containing the conductive material had larger capacity retaining percentage of the 200th cycle than that of the battery of the Control 6. Further, as shown in Table 3 and Table 5, it become obvious that, when the fibers with the average fiber diameter of at most 5 μm and the average fiber length of at least 5 μm were contained, a preferable cycle characteristic could be obtained. Incidentally, the same effect as using the potassium titanate whiskers could be obtained when glass fibers were used instead of the potassium titanate whiskers.

The cylindrical lithium-ion battery 30 with high safety and long cycle life is also suitable for the power supply source for the HEV, as stated above. Incidentally, the first embodiment did not refer to the improvement in the cycle characteristic, but it goes without saying that the cycle characteristic in the first embodiment can be improved by using the conductive material shown in the second embodiment.

Further, in the above embodiments, large-sized batteries used for the power supply source for the EV or HEV have been explained, however, the size and battery capacity of the battery of the present invention is not limited to these embodiments.

Furthermore, in the above embodiments, the lithium manganate was used for the positive electrode, the amorphous carbon was used for the negative electrode, and the electrolytic solution was prepared by dissolving the 6-lithium phosphate fluoride at 1 mole/liter into the mixed solution of ethylene carbonate, dimethyl carbonate and the like. However, there is no limitation in the battery manufacturing method according to the present invention, and on top of it, as the binder, the negative electrode active material and the non-aqueous electrolytic solution, ordinarily usable ones can be applied. However, in order to secure high capacity, high power, high safety and long life, it is preferable to use lithium manganate which is lithium-manganese complex oxide instead of lithium-cobalt complex oxide or lithium-nickel complex oxide.

Also, in the above embodiments, the PVDF was used as the binder. However, as binders other than the above-mentioned binder, polymers such as Teflon, polyethylene, polystyrene, polybutadiene, butyl rubber, nitrile rubber, styrene/butadiene rubber, polysulfide rubber, cellulose nitrate, cyanoethyl cellulose, various latex, acrylonitrile, vinyl fluoride, vinylidene fluoride, propyle fluoride chloroprene fluoride and the like, and a mixture thereof can be used.

Furthermore, as the positive electrode active material for the lithium-ion secondary battery other than the material shown in the above embodiments, lithium-manganese complex oxide into/from which lithium ions can be inserted (occluded) and/or departed (released), and in which lithium ions have been inserted (occluded) in a sufficient amount in advance is preferable. Lithium manganate having the spinel structure or each/both site(s) of manganese or lithium in a crystal thereof is (are) replaced or doped with elements other than these elements may be used.

Also, negative electrode active material for the lithium-ion battery other than ones shown in the above embodiments can be used, which does not limit the present invention. For example, natural graphite, various artificial graphite materials and cokes may be used. The particle shapes of these materials may include scale shape, sphere shape, fiber shape, massive shape and the like, but the active material is not limited to particular shapes.

Also, as the electrolytic solution, an electrolytic solution where an ordinary lithium salt is dissolved as electrolyte into an organic solvent, and the lithium salt and the organic solvent are not limited to these particular ones. For example, as the electrolyte, $LiClO_4$, $LiAsF_6$, $LiPF_6$, $LiBF_4$, $LiB(C_6H_5)_4$, $CH_3SO_3Li$, $CF_3SO_3Li$ and the like, and a mixture thereof may be used.

Further, as the organic solvent for the non-aqueous electrolytic solution other than ones shown in the above embodiments, polypropylene carbonate, ethylene carbonate, 1,2-diethxy ethane, 1,2-dimethxy ethane, y-butyrolactone, tetrahydrofuran, 1,3-dioxolane, 4-methyl-1,3-dioxolane, diethyl ether, sulfolane, methyl sulfolane, acetonitrile, propionitrile or the like, or mixtures of two kinds thereof can be used. Further, the mixture-compounding ratio is not limited to particular ratios.

Furthermore, in the first embodiment, the adhesive tape comprising the base material of polyimide and the adhesive agent of hexametha-acrylate applied to one side face thereof was used. This invention is not limited to this adhesive tape. For example, an adhesive tape comprising a base material of polyolefin such as polypropylene or polyethylene and the like and acrylylic system adhesive agent such as hexametha-acrylate, butyl-acrylate or the like applied to one side surface or both side surfaces of the base material, or a tape without applying adhesive agent thereon and comprising polyolefin or polyimide or the like can also be used preferably.

In the above embodiments, the cylindrical lithium-ion batteries were used as the examples, but the present invention is not limited to the cylindrical winding group or the cylindrical battery container. Even when the positive electrode member and the negative electrode member are wound through the separator(s) in a triangle shape, rectangular shape, polygonal shape or the like to be inserted into a battery container, the safety and life characteristics of the battery do not decline.

What is claimed is:

1. A lithium-ion battery where a winding group having a positive electrode, a negative electrode and at least one separator, and a connecting portion for connecting to respective terminals from the winding group are accommodated in a battery container, and which is provided with an internal pressure-reducing mechanism for discharging gas according to an increase in internal pressure inside the battery container, wherein the positive electrode comprises a collector whose both surfaces are applied with composing material including lithium-manganese complex oxide, the thickness of the composing material on the both surfaces of the collector is at least 210 μm, and the amount of the active material per one surface of the collector is at least 240 g/m$^2$.

2. A lithium-ion battery according to claim 1, wherein the compounding ratio of the lithium-manganese complex oxide in the composing material is at least 80 weight %.

3. A lithium-ion battery according to claim 1, wherein the negative electrode comprises a second collector whose both surfaces are applied with second composing material including carbon material, and the thickness of the second composing material on the both surfaces of the second collector is at least 130 μm.

4. A lithium-ion battery according to claim 2, wherein the negative electrode comprises a second collector whose both surfaces are applied with second composing material including carbon material, and the thickness of the second composing material on the both surfaces of the second collector is at least 130 μm.

5. A lithium-ion battery according to claim 1, wherein the lithium-manganese complex oxide is lithium manganate.

6. A lithium-ion battery according to claim 3, wherein the carbon material is amorphous carbon.

7. A lithium-ion battery according to claim 1, wherein the negative electrode comprises a second collector whose both surfaces are applied with second composing material including carbon material, and the second composing material contains fiber-shaped or needle-shaped conductive material.

8. A lithium-ion battery according to claim 3, wherein the second composing material contains fiber-shaped or needle-shaped conductive material.

9. A lithium-ion battery according to claim 7, wherein the conductive material is carbon fibers manufactured by a vapor-phase method or conductive ceramic fibers.

10. A lithium-ion battery according to claim 8, wherein the conductive material is carbon fibers manufactured by a vapor-phase method or conductive ceramic fibers.

11. A lithium-ion battery according to claim 7, wherein the conductive material has an average fiber length of at least 5 μm and an average fiber diameter of at most 5 μm.

12. A lithium-ion battery according to claim 8, wherein the conductive material has an average fiber length of at least 5 μm and an average fiber diameter of at most 5 μm.

13. A lithium-ion battery according to claim 9, wherein the conductive material has an average fiber length of at least 5 μm and an average fiber diameter of at most 5 μm.

14. A lithium-ion battery according to claim 10, wherein the conductive material has an average fiber length of at least 5 μm and an average fiber diameter of at most 5 μm.

15. A lithium-ion battery according to claim 1, wherein the negative electrode comprises a second collector whose both surfaces are applied with a second composing material, wherein the second composing material contains fiber-shaped or needle-shaped conductive material and wherein the conductive material has an average fiber length of at least 5 μm and an average fiber diameter of at most 5 μm.

16. A lithium-ion battery according to claim 15, wherein the conductive material is carbon fibers manufactured by a vapor-phase method or conductive ceramic fibers.

17. A lithium-ion battery according to claim 15, wherein the lithium-manganese complex oxide is lithium manganate.

18. A lithium-ion battery according to claim 15, wherein the conductive material is amorphous carbon.

* * * * *